(12) United States Patent
Davidson

(10) Patent No.: US 9,890,566 B1
(45) Date of Patent: Feb. 13, 2018

(54) THEFT PROOF GROUND VAULT AND LOCKING LID

(71) Applicant: Jim Davidson, Oklahoma City, OK (US)

(72) Inventor: Jim Davidson, Oklahoma City, OK (US)

( * ) Notice: Subject to any disclaimer, the term of this patent is extended or adjusted under 35 U.S.C. 154(b) by 200 days.

(21) Appl. No.: 14/757,000

(22) Filed: Nov. 6, 2015

(51) Int. Cl.
| | |
|---|---|
| H02G 3/08 | (2006.01) |
| E05B 65/00 | (2006.01) |
| E05C 9/04 | (2006.01) |
| E05C 9/00 | (2006.01) |
| E05B 67/38 | (2006.01) |
| H02G 3/14 | (2006.01) |

(52) U.S. Cl.
CPC .......... *E05B 65/0089* (2013.01); *E05B 67/38* (2013.01); *E05C 9/004* (2013.01); *E05C 9/042* (2013.01); *E05C 9/043* (2013.01); *E05C 9/047* (2013.01); *H02G 3/14* (2013.01); *E05B 2067/386* (2013.01)

(58) Field of Classification Search
CPC .......... E05B 65/0089; E05B 2067/386; E05B 59/00; E05C 9/004; E05C 9/042; E05C 9/043; E05C 9/047; H02G 3/14; E05F 11/00; Y10T 292/0867; Y10T 292/0866
See application file for complete search history.

(56) References Cited

U.S. PATENT DOCUMENTS

| | | | | |
|---|---|---|---|---|
| 1,142,463 | A * | 6/1915 | Shepherd | E05B 59/00 292/40 |
| 1,210,197 | A | 12/1916 | O'Connor | |
| 1,400,399 | A | 12/1921 | Yeeche | |
| 1,758,395 | A * | 5/1930 | Fox | E05C 9/045 70/66 |
| 1,788,118 | A | 1/1931 | Meyer | |
| 1,917,973 | A | 7/1933 | Hughes | |
| 2,148,050 | A * | 2/1939 | Moseley | E05C 9/042 292/1 |
| 3,457,744 | A * | 7/1969 | Bisbing | E05C 9/043 292/7 |
| 3,953,061 | A * | 4/1976 | Hansen | E05C 9/002 292/34 |
| 4,015,454 | A * | 4/1977 | Struble | E05C 1/08 292/150 |
| 4,113,291 | A | 9/1978 | Cameron | |
| 4,852,920 | A | 8/1989 | DeForrest, Sr. | |
| 4,902,165 | A | 2/1990 | Embree | |
| 5,082,392 | A | 1/1992 | Marchese | |
| 5,470,115 | A * | 11/1995 | Berg | E05B 63/20 292/335 |
| 7,007,986 | B2 | 3/2006 | Lodwick | |
| 7,560,642 | B2 | 7/2009 | Yguelzi | |
| 7,798,742 | B2 | 9/2010 | Nolte | |
| 7,884,283 | B1 | 2/2011 | Ousley | |

(Continued)

*Primary Examiner* — Steven A. Reynolds
*Assistant Examiner* — James Way
(74) *Attorney, Agent, or Firm* — Randal D. Homburg

(57) ABSTRACT

A locking lid for a ground vault, generally containing high voltage cable junctions or communication lines, provides a secure lid locking to the ground vault which prevents removal of the lid from the vault by an unauthorized person, preventing theft of the contents of the vault including high voltage electrical lines, communication lines or other buried equipment which might be stolen for salvage or subject to vandalism.

5 Claims, 6 Drawing Sheets

(56) References Cited

U.S. PATENT DOCUMENTS

| | | |
|---|---|---|
| 7,975,515 B2 | 7/2011 | Ygnelzi |
| 7,997,630 B2 * | 8/2011 | Lemley .................. E05B 83/02 292/3 |
| 2003/0137151 A1 * | 7/2003 | Eggum .................. E05C 9/043 292/98 |
| 2007/0046032 A1 * | 3/2007 | Moore ................. E05B 13/001 292/36 |

* cited by examiner

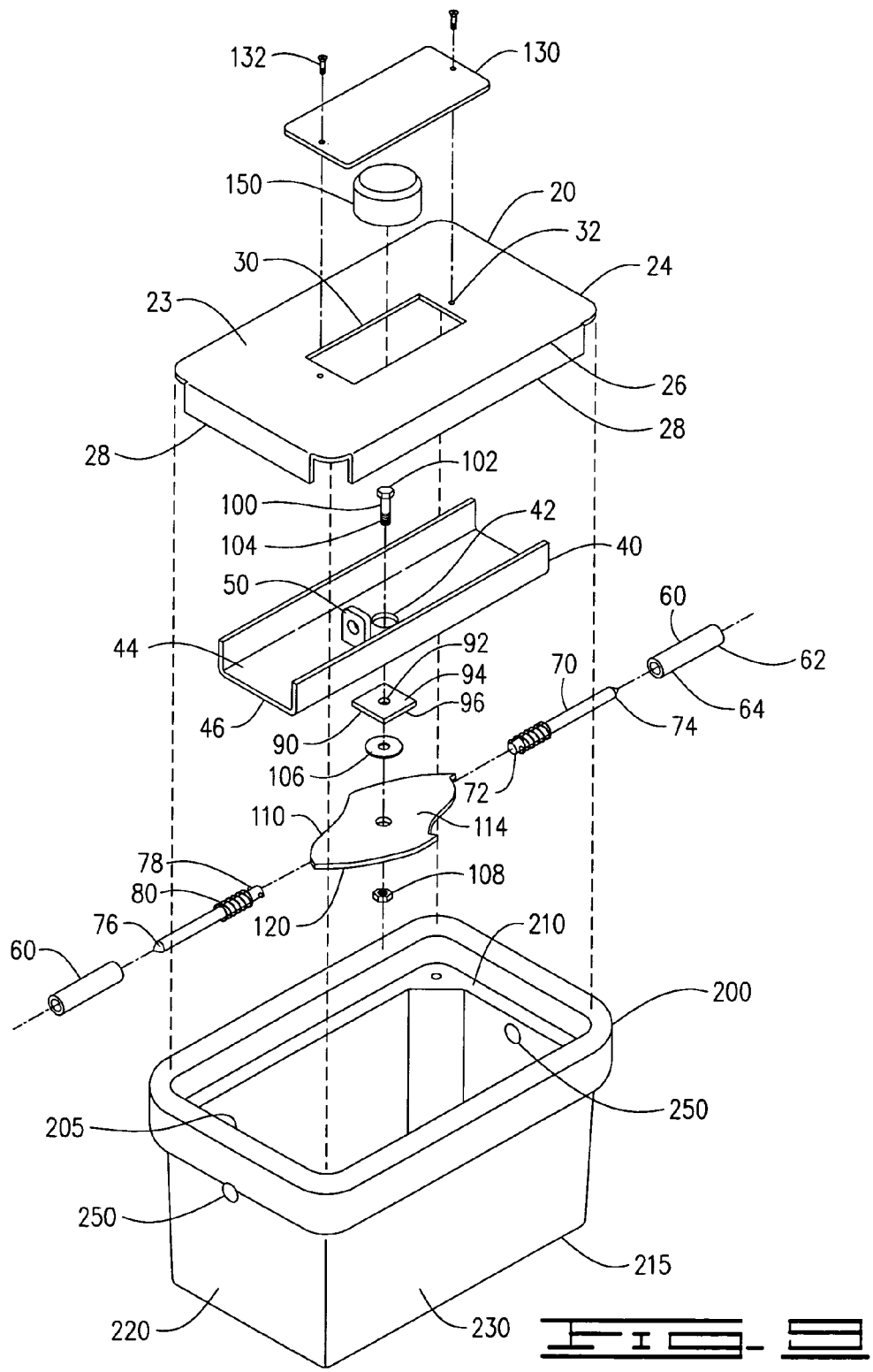

THEFT PROOF GROUND VAULT AND LOCKING LID

CROSS REFERENCE TO RELATED APPLICATIONS

None.

I. BACKGROUND OF THE INVENTION

1. Field of Invention

A locking lid for a ground vault, generally containing high voltage cable junctions or communication lines, provides a secure lid locking to the ground vault which prevents removal of the lid from the vault, preventing theft of the contents of the vault including high voltage electrical lines, communication lines or other buried equipment which might be stolen for salvage or subject to vandalism.

2. Description of Prior Art

A preliminary review of prior art patents was conducted by the applicant which reveal prior art patents in a similar field or having similar use. However, the prior art inventions do not disclose the same or similar elements as the present security lid and ground vault, nor do they present the material components in a manner contemplated or anticipated in the prior art.

There are several lock covers adapted to light poles, which secure over an opening in the light pole or base. In U.S. Pat. No. 7,884,293 to Ousley, a security cover includes a flap covering which engages a transverse hole in a stem which is connected to a locking bar which spans the opening on lateral margins behind the opening, with two embodiments presented for a round or square opening. In the pending application of Butler, U.S. Pub. No. 2013/0333939, a special insert into a utility pole secures wires so that they may not be removed from inside the pole. U.S. Pat. No. 6,303,863 to Raasch discloses an outer cover and an inner claw tool and utilize a common threaded bolt for quick application of the cover, without any noticeable security aspect to the disclosed cover assembly. There are two additional manhole locking devices disclosed in U.S. Pat. No. 5,082,392 to Marchese and U.S. Pat. No. 7,798,742 to Nolle which identify cams, springs and keys, but do not provide the lockout security features and shown and disclosed in the present utility cover lock. Several other manhole access cover locks are shown in several patents, including U.S. Pat. No. 1,788,118 to Meyer, U.S. Pat. No. 1,400,399 to Yaeche, and U.S. Pat. No. 1,210,197 to O'Connor. Covers over a keyed locking plate are shown in two prior art patents that involve a pivotal cover which secure to block access to the underlying lock to disengage the door within which it is installed including U.S. Pat. No. 1,917,973 to Hughes is presented for an automobile or other keyed lock, and U.S. Pat. No. 4,113,291 to Cameron, which is disclosed for use as a door locking system, either of which could be used for other purposes.

In U.S. Pat. No. 7,007,986, a cover is shown over a utility pole lock that has one end of the cover secured by a non-removable bolt on a spring and a cap lock, with the other end attached by a screw in a threaded bore. That is the only similarity to the present manhole cover, and in the present invention, that only covers a singular embodiment. Two patent to Ygnelzi have a concealed locking means, as identified in U.S. Pat. Nos. 7,975,515 and 7,560,642. In 642, a standard padlock is inserted beneath a cover plate to secure the lock to a hasp that locks the plate in place. In 515, it appears an underground collar includes a lid that locks by a sliding locking means that compels four arms that lock underneath a rim provided by a sectional box enclosure or insert. Sliding the lock means extends and contracts the arms, allowing a locking engagement or a released engagement for removal of the cover. This locking device is inserted within the underground enclosure and provides much more than a lid.

II. SUMMARY OF THE INVENTION

Two major crimes are committed by thieves and vandals towards underground utility boxes—wire theft or vandalism. In wire theft, the high voltage and communication cables contained within the utility boxes are removed for a few dollars worth of wire at a cost of thousands to repair and replace the damage, not to mention the failure of the equipment operated by those wires and cables. In vandalism, the contents of the box are damaged, many times to deactivate the eventual equipment for no purpose beyond a joke or prank. Deactivating this equipment, often traffic control devices and lighting, can result in significant traffic accidents and once again thousands of dollars in repair and hours of signal failure and lighting.

Underground boxes are installed in nearly every roadside or business location to provide a junction for wire and cable connections, quite similar to that found in common household electrical junction boxes. These power lines contain high voltage and amperage and few of us would concern ourselves with the electrocution of a wire thief. However, it can also pose injury and risk to repair workers and innocent people. These boxes also contain expensive computer and communication cables since traffic controls operate on computer components and/or timing and sequencing accessories.

The prior art does not effectively deter intrusion into these utility boxes because it is still an every day occurrence. Some of them will slow down intrusion, but it will not eliminate intrusion because their security features can be bypassed with a saw or a lock cutter. Others are quite costly and complicated and are not suitable for aftermarket application without significant installation. The present utility cover can be installed on any existing utility box mounted within the ground or a vertical surface. The only modification required is the introduction of two holes in the underground box, neither of which require a through and through bore. The cover is a replacement for the OEM lid and is a simple two piece product when manufactured—a lid and a lock and perhaps a third piece defining a simple cover plate. It has now been found, surprisingly and unexpectedly, that this utility lid cannot be breached to allow entry into the underground utility junction box.

This product clearly produces an unexpected success over prior products in a similar field or art, a preferred use over prior art and requires no modification of an existing utility box outside the two lateral holes being drilled in the box. It has demonstrated an unexpected and incomparable efficiency in preventing theft or damage to the utility and power cables in the underground box. Those skilled in the art will readily identify the superior and unduplicated results of this product over any prior art utility box lids or manhole covers.

III. DESCRIPTION OF THE DRAWINGS

The following drawings are submitted with this utility patent application.

FIG. 9 is an exploded view of the component parts of the utility box and secure lid.

IV. DESCRIPTION OF THE PREFERRED EMBODIMENT

Figure 1:
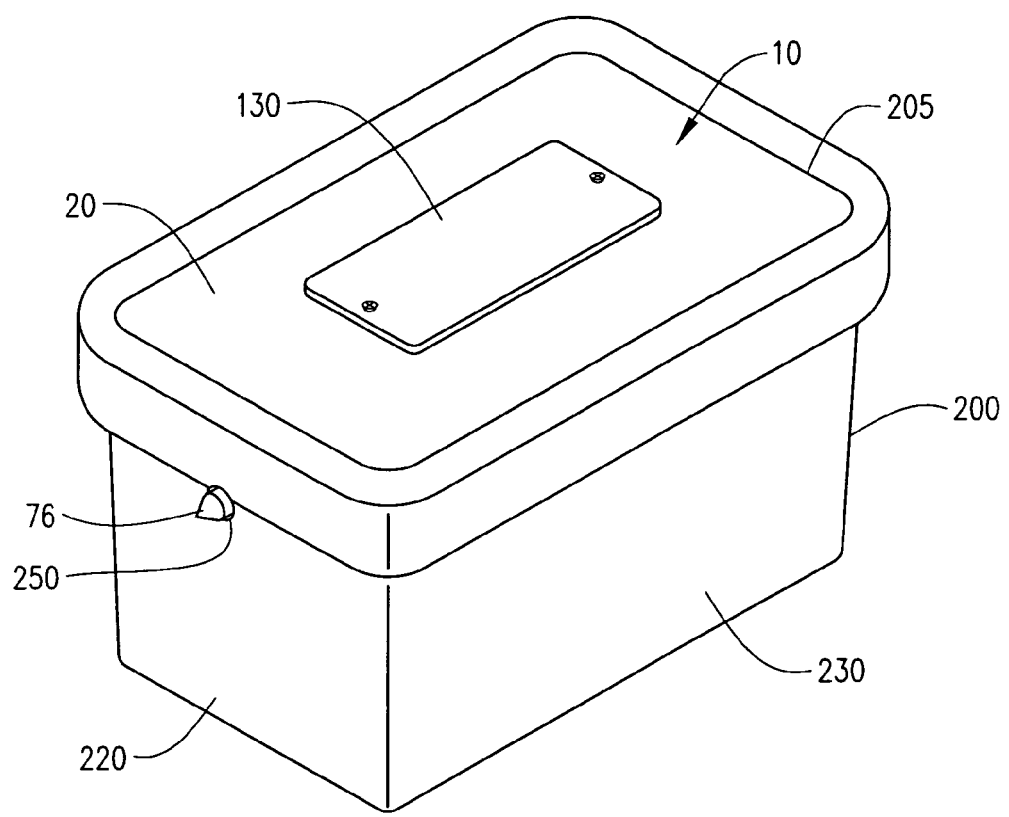
FIG. 1 is a perspective view of the utility box with the secure lid installed and the secure lid plate positioned over the upper lock access.
Figure 2:
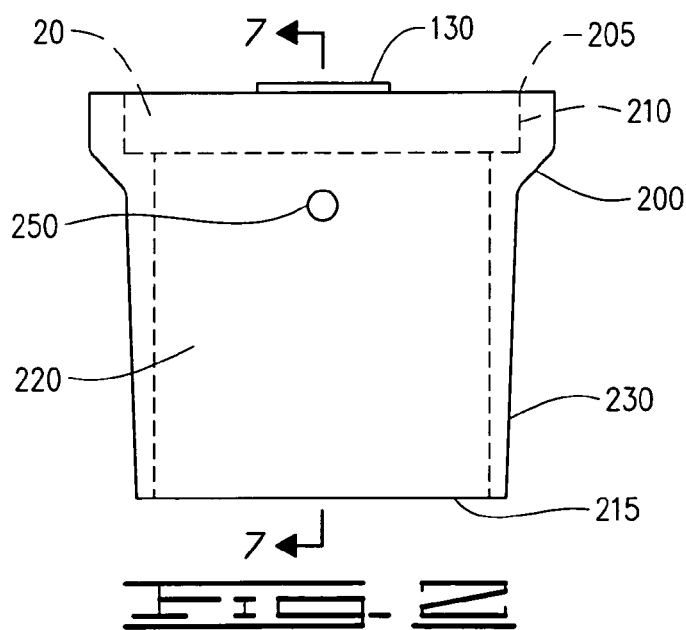
FIG. 2 is an end view of the utility box with the secure lid installed having phantom lines indicating the interior margins of the utility box.
Figure 3:
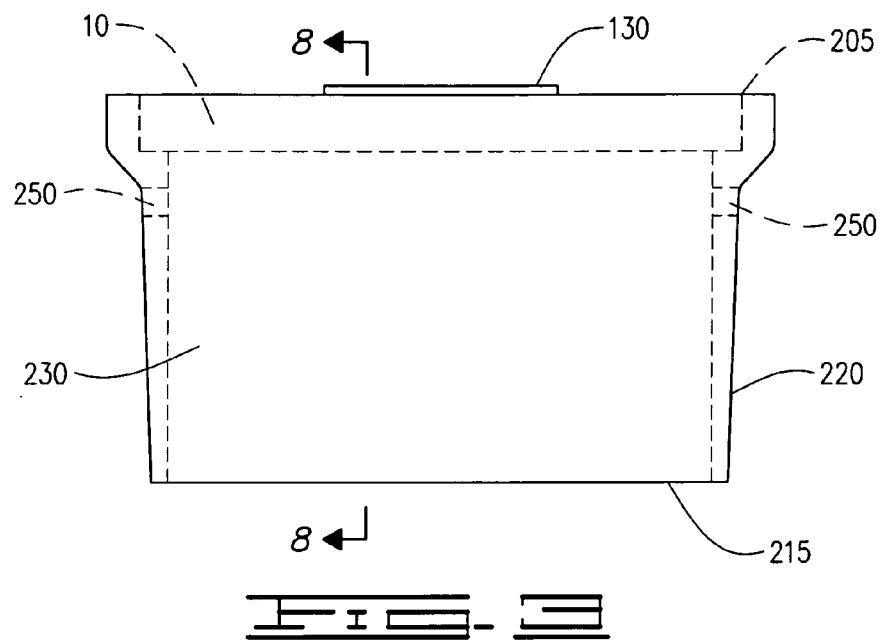
FIG. 3 is a side view of the utility box with the secure lid installed having phantom lines indicating the interior margins of the utility box.
Figure 4:
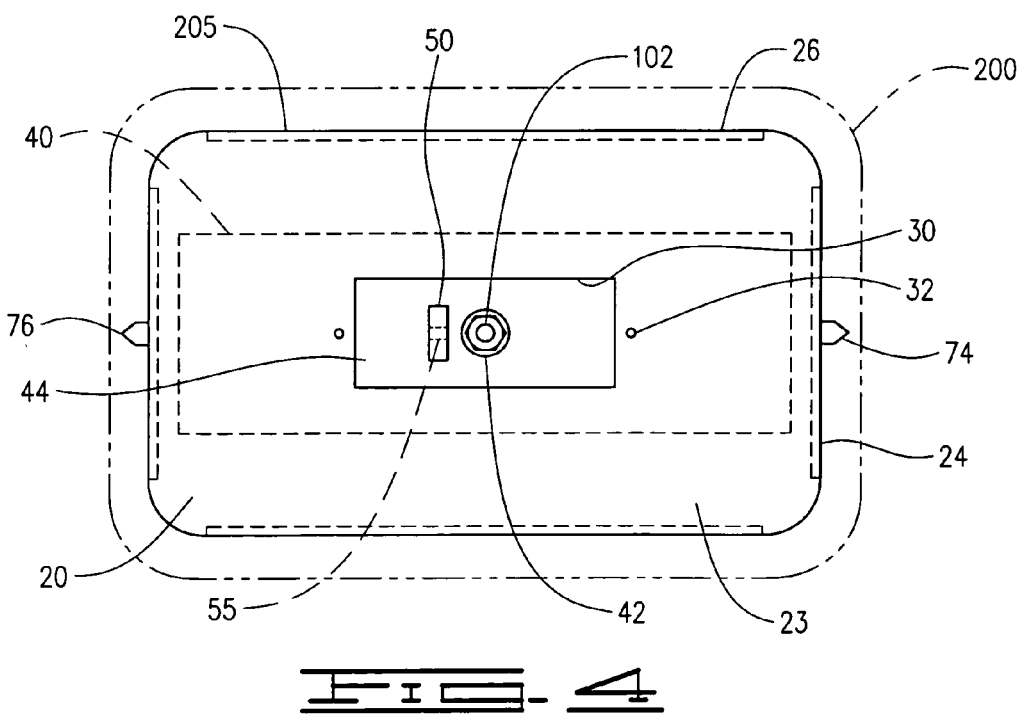
FIG. 4 is a top view of the secure lid installed within the upper opening of the utility box, the utility box indicated in phantom line.

An improved locking lid 10 for an in-ground utility junction box 200, shown in FIGS. 1-9, replaces a cover on the utility box to provide the locking lid for the prevention of damage or theft to the in-ground utility junction box contents, the improved locking lid 10 having the dimensions provided by the manufactured cover or suitable for insertion and securing within an inner upper rim 210 collar within an upper opening 205 of the utility junction box 200. The utility junction box 200 requires no modification other than the application of a pair of axially aligned locking apertures 250, as demonstrated in FIGS. 1-3, 7 and 9.

The utility junction box 200, in the embodiment shown in the drawings, is a rectangular box defining the upper opening 205 having the inner upper rim collar 210, a lower opening 215 providing access to the buried contents below the utility junction box 200, further defining opposing end sections 220 and opposing side sections 230. It is provided in cast concrete, cast fibrous composites, or ceramic and is secured by concrete within the ground over a location where the contents of the utility junction box can be accessed, most generally a connection or junction of the contents, the contents normally consisting of high voltage cables, communication cables or traffic signal wiring and cables. It should be noted that contemplated within the scope of this utility junction box 200, the box may be supplied in a shape other than rectangular as shown in the drawings. These contents are most commonly associated with the deliver of power or communication lines associated with traffic signals, traffic lighting, or power and communication to large buildings and manufacturing facilities. As indicated above, these utility junction boxes 200 are often accessed by thieves or vandals to steal the contents for scrap salvage or intentional acts of vandalism. Most often the repair costs far exceed the value of the contents when time, replacement materials and labor are calculated, not including the risk and danger associated with nonoperational traffic signals, lighting or utility power to a location. In preparation of the utility junction box 200 for the application of the improved locking lid 10, transverse aligned locking apertures 250 are measured and drilled in the two end sections 220 of the utility junction box at location coinciding with the location of a set of locking pins 70 within the improved locking lid 10, further described below.

The improved locking lid 10 further defines an upper plate 20 having a lower surface 22, an upper surface 23, opposing ends 24, opposing sides 26 and edges 28 depending from each respective end 24 and side 26, as shown in FIG. 9. It should be noted within the scope of this improved locking lid 10 that its shape may be that other than shown in the drawings herein, but would conform to the shape of the utility junction box 200. Within the upper surface 23 is a central opening 30 through to the lower surface 22. Attaching to the lower surface 22 is a support bar 40 defining a central bore 42, the support bar 40 preferably presented as a channel with the channel opening 44 facing and securing to the lower surface 22, and positioned from end to end 24 between the edges 28, FIGS. 5-7. The support bar 40 further defines a lower surface 46 to which a pair of pin sleeves 60 are secured along a longitudinal axis of the support bar 40, as indicated in FIGS. 5-8. Also attached within the channel opening 44 adjacent to the central bore 42, is an upward extending lock extension flange 50 defining a transverse lock bore 55. The positioning of this lock extension flange 50 is critical as the further specification will reveal regarding the application of a specific security circular lock 150 required to provide the complete security leading to the unexpected success and results found with this improved secure lid 10 in making it virtually impenetrable.

A cam bolt 100 having a unique shaped tool head 102 receiving a unique socket, not shown but anticipated, is inserted through the central bore 42 of the support bar 40, the tool head 102 exposed through the central opening 30 in the upper plate 20 and a lower threaded shaft 104 further extending through the central bore 30. The central bore 30 receives the tool head 102 with the tool head 102 supported from below by a cam bolt support plate 90 by an upper surface defining a central aperture 92 through which the lower threaded shaft 104 of the cam bolt 100 penetrates, the upper surface 94 of the cam bolt support plate 90 welded or otherwise attached to the lower surface 46 the support bar 40, the central aperture 92 of a reduced diameter than the central bore 42 of the support bar 40 preventing the tool head 102 of the cam bolt 100 from insertion within the central aperture 92, but allowing the threaded shaft 104 of the cam bolt 100 to pass. A unique shaped cam plate 110 having a central cam opening 112 is attached to the threaded shaft 104 of the cam bolt 100 and retained by a cam locking nut 108, preferably with a washer 106 inserted between a lower surface 96 of the cam bolt support plate 90 and an upper surface 114 of the cam plate 110 for assisting in rotational movement of the cam plate 110 as the cam bolt tool head 102 and the cam bolt 100 are rotated during locking and unlocking operations, further defined below.

Figure 5:
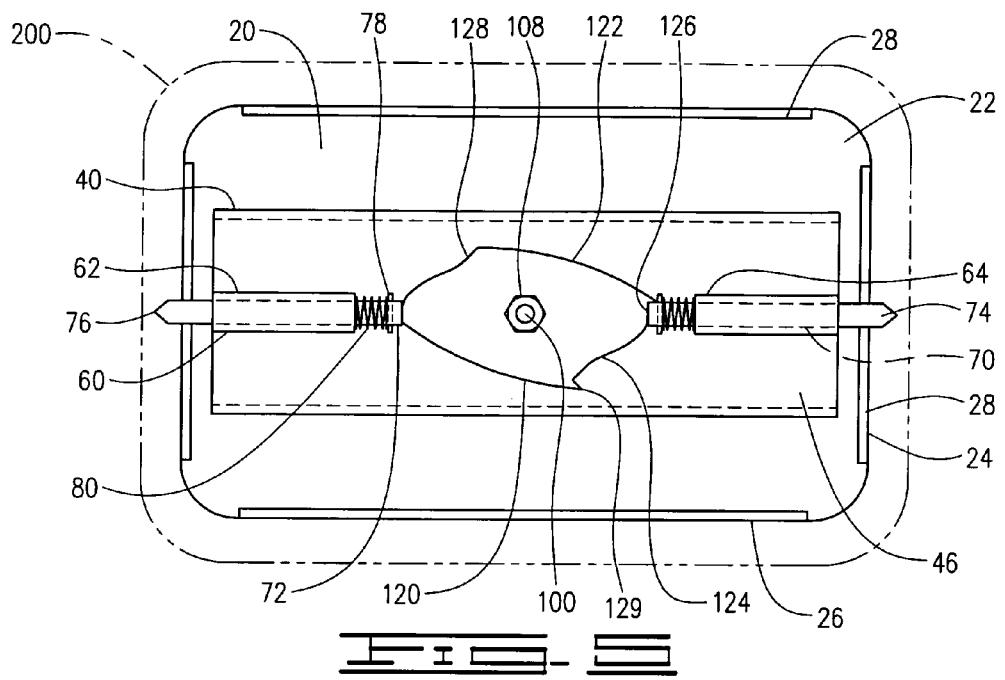
FIG. 5 is a lower surface view of the secure lid with the utility box indicated in phantom line in a locked position.
Figure 6:
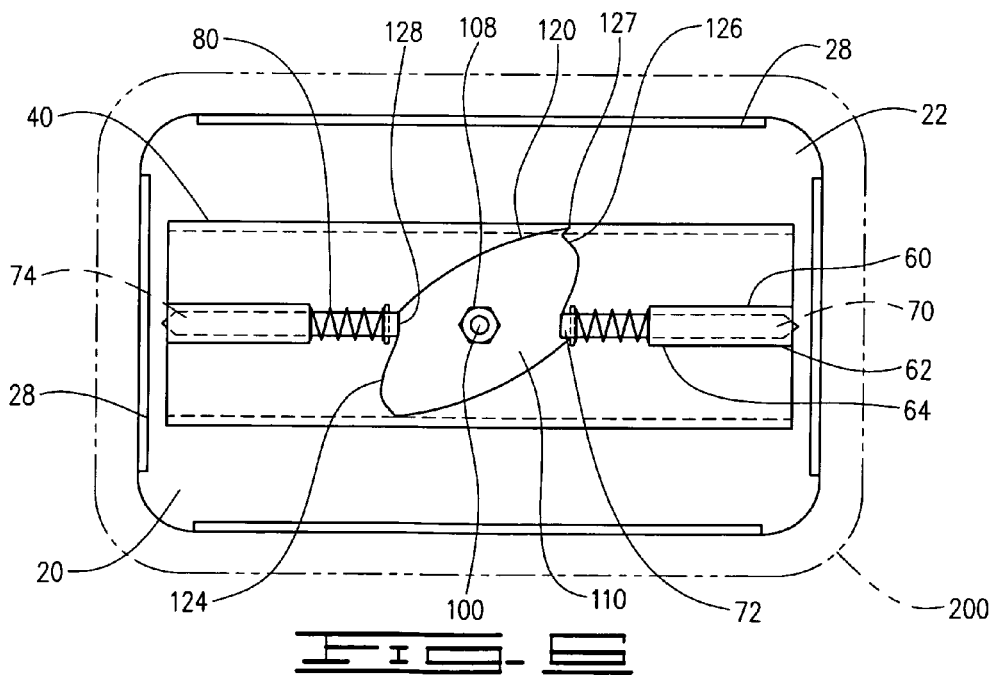
FIG. 6 is a lower surface view of the secure lid with the utility box indicated in phantom line in an unlocked position.
Figure 7:
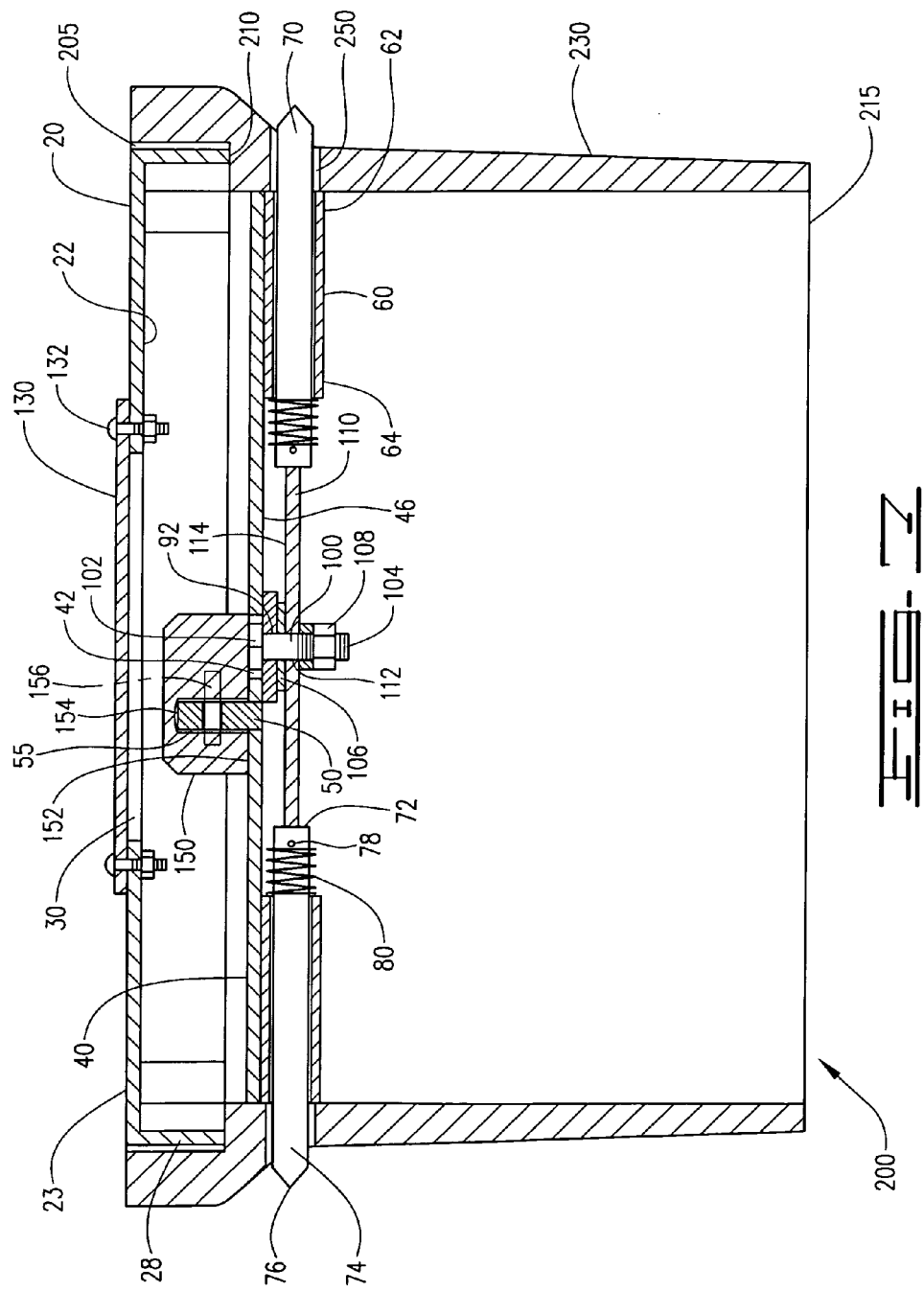
FIG. 7 is a side cross sectional view of the utility box ans secure lid along sectional lines 7/7 of FIG. 2, indicating a locked position.

The locking pins 70, as described above, are cylindrical pins having a cam end 72 that is flat and a lock end 74 that terminates in a central tapered point 76. The locking pin 70 further defines a pin collar or transverse shaft pin 78 proximal to the cam end 72. These locking pins 70 are independently and slidably contained within the pins sleeves 60 as shown in FIGS. 5-9, each pin sleeve 60 further defining an outer end 62 and an inner end 64. Upon each locking pin 70 is a torsion spring 80. Each locking pin 70 is placed within the respective pin sleeve 60 with the torsion spring 80 positioned between the pin collar or transverse shaft pin 78 and the inner end 64 of the pin sleeve 60, as shown in FIGS. 5-7. Each respective torsion spring 80 provides an independent force to urge each locking pin 70 inward towards the cam plate 110. Each cam end 72 is in constant contact with an outer perimeter edge 120 of the cam plate 110 during rotational movement of the cam plate 110, as demonstrated by contrast between FIGS. 5 and 6.

The cam plate 110 is further defined by its upper surface 114, its outer perimeter edge 120, its central cam opening 112, but also its shape. The shape is best shown in FIGS. 5-9, but is described for purposes of best mode as having an overall ovoid shape. It must be symmetrical to provide equal and common movement of the locking pins 70, so a line drawn from any point along the outer perimeter edge 120 through the central cam opening 112 would result in bilateral symmetry. As best as can be described in words, two opposing edges of the cam plate are a convex curves 122, these convex curves 112 having no contact with the locking pins 70. The perimeter edges which actually have contact with the cam end 72 of each locking pin 70 forming an S-curve 124 with a flat open position edge formed at a first end 126 of the S-curve 124 and a flat locked position edge formed at a second end 128 of the S-curve 124, FIG. 5 demonstrating the cam end 72 of the locking pins 70 in contact with the second end 128 of the S-curve 124, while FIG. 6 demonstrates the cam end 72 of the locking pins 70 in contact with the first end 126 of the S-curve 124. The cam plate 110 is rotated by turning of the tool head 102 of the cam bolt 100 which in turn rotates the cam plate 110 from an open position, FIG. 6 to a locked position, FIG. 5, and back, the turning of the tool head of the cam bolt 100 restricted to a quarter turn by the inclusion of respective stop tips 127, 129, located on each first end 126 and second end 128, limiting the rotational movement of the cam bolt 100 to a quarter turn radius. As the cam plate 110 is rotated from the open position to the locked position after the locking lid 10 is seated upon the upper rim collar 210 of the utility junction box 200, the central tapered point 76 of the lock end 74 of each locking pin 70 are forced beyond the edge 28 of each end 24 of the upper plate 20 and enters the respective transverse locking holes 250 of the utility junction box 200, as previously disclosed, and further as shown in FIGS. 1, 4, 5 and 7, and are locked.

The cam plate 110, having the previously disclosed symmetrical shape and uniform perimeter edge 120 provide the cam plate 110 with the ability to move the locking pins 70 uniformly outward and to contract with uniform movement during rotation of the cam plate 110. When one locking pin 70 is locked, both locking pins 70 are locked and when one locking pin 70 is retracted and removed from engagement with the locking apertures 250 in the utility junction box 250, both locking pins 70 are withdrawn from the respective locking apertures 250.

Figure 8:
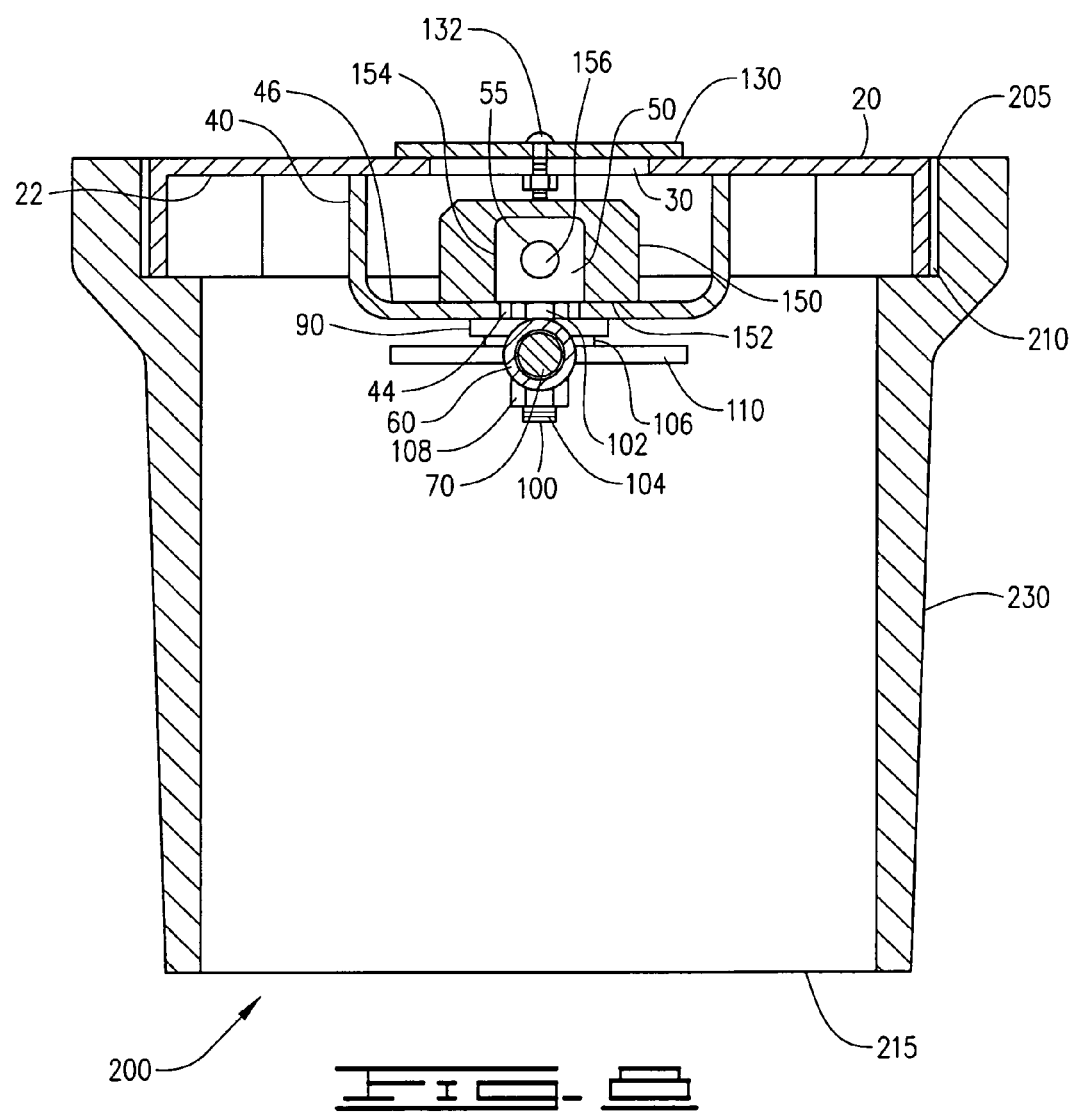
FIG. 8 is a n end cross sectional view of the utility box and secure lid along sectional lines 8/8 of FIG. 3.

A weather plate 130 is provided to attach over the central opening 30 of the upper plate 20 and, as shown in FIGS. 1, 2 and 7-9, it is a flat plate larger than the central opening 30 and attaches to the upper plate 20 using two screws 132, as shown in FIG. 9, or two nuts and bolts 132, as shown in FIGS. 7 and 8. The purpose of the weather plate 130 is to prevent water and moisture from entry into the locking lid 10 and its interior components. The nuts 132 are preferably secured to the lower surface 22 below holes 32 drilled through the upper plate 20 or the holes 32 may be provided as a threaded hole, not shown. The nuts and bolts or screws 132 may also be provided as rivets. It is contemplated that the weather plate 130 may also include a seal, not shown, further applied to either the weather plate 130 or the upper surface 23 of the upper plate 20.

The lock extension flange 50 adjacent to the central bore 42 of the channel opening 44 of the support bar 40 provides a location for the application of a specific circular lock 150 which is applied to the lock extension flange 50. The sole purpose for this circular lock 150 and connecting lock extension flange 50 is to completely block any access to the tool head 102 of the cam bolt 100 once the cylindrical lock 150 is engaged with the lock extension flange 50. This circular lock 150 is not subject to bypass or breach, as would be a padlock or other known lock, through the limited area of the central opening 30 by a hacksaw, bolt cutters or other cutting tool. This type circular lock 150 is also resistant to breach by most gas torches, taking much longer to remove in this manner than other known or conventional locks. Padlocks have a shackle that is exposed which can be cut by bolt cutters. The specific type circular lock 150 applied to this improved locking lid 10 is a hidden shackle lock which, when applied, can not be removed vertically or disengaged from a locked flat profile without a key. Access cannot be rendered to the lock extension flange 50 or any area below the applied circular lock 150. The lock, shown in FIGS. 7-9 is the specific type circular lock 150 referenced within this specification as a hidden shackle circular lock. These lock as are manufactured and sold under several different commercial products, including but not limited to a MASTER-LOCK® 6270, 6271 Round Solid Steel Padlock, a TOLEDO® Model TBK400 round Padlock with Black Electric Coating, a NUSET® Model 5373-3 Solid Steel Hidden Shackle Padlock, an AMERICAN LOCK® Solid Steel Hidden Shackle Padlock, Model Nos. A2000, A2001, A2010, A2500, A2500D, A2000D, SCHLAGE® 855156 Shackle-Less Padlock. Therefore, as used in this specification, the circular lock 150 will be restricted by definition to the secure locks having a hidden shackle 156 with a circular shape and a flat side profile which attaches to the lock extension flange 50 from a lower surface 152 of the circular lock 150 through a lock flange slot 154 with the lock shaft/hidden shackle 156 within the circular lock 150 pushed and pulled through the lock flange slot 154 by rotation of a key, the hidden lock shaft/shackle 156 securing through the transverse lock bore 55 of the lock extension flange 50 without exposure. As that circular lock 150 is already under one or more patents, the components of the cylindrical locks are not claimed by this specification or claims with the exception of identifying the parts for reference as to the integration of these parts to the present locking lid 10. Nonetheless, it is essential that this circular lock 150, and this type circular lock 150 only be used with the locking lid 150, because it is the only lock possessing the ability to completely prevent access to the tool head 102 of the cam bolt 100 contained within the central bore 42, that has no exposed shackle to cut or bypass, and that can not be pried upward or remove through the central opening 30 by a tool.

Utilizing the improved locking lid 10 requires the application of the locking apertures 250 in the utility junction box 200, as indicated above, and placement of the improved locking lid 10 in the inner upper rim collar 210 in place of the factory lid or may come from the manufacturer with the improved locking lid 10 supplied with the utility junction box 200 with the locking apertures 250 pre-drilled. Once in place, the unique tool head 102 of the cam bolt 100 is rotated as is the cam plate 110, S-curve 124 along the outer perimeter edge 120 of the cam plate 110 driving the locking pins 70 outward to insert the tapered points 76 of the lock end 74 of each locking pin 70 into the respective locking aperture 250 of the utility junction box 200. Once locked, the circular lock 150 is placed upon the lock extension flange 50 and the lock shaft/hidden shackle 156 is secured through the transverse lock bore 55, the circular lock 150 completely covering the tool head 102 of the cam bolt 100, preventing further access to the cam bolt 100 for disengagement. At this point, the improved locking lid 10 cannot be removed from the utility junction box 200 until the circular lock 150 is removed, the tool head 102 is rotated to release the locking pins 70 from the locking apertures 250, and the improved locking lid 10 is removed from the upper opening 205 of the utility junction box 200 allowing access to the contents of the utility junction box 200 below the lower opening 215.

Materials used in this improved locking lid 10 should be made of strong, weather resistant metals, including stainless steel, coated steel, high carbon steel or a cast metal, with the locking pins 70 being a dense and preferably rolled steel pin milled to functional specification. The formation of the upper plate 20 can be welded or pressed with the attachment of the sleeves 60 by welding or strong adhesion.

While the improved locking lid 10 and modified utility junction box 200 have been particularly shown and described with reference to a preferred embodiment thereof, it will be understood by those skilled in the art that changes in form and detail may be made therein without departing from the spirit and scope of the invention.

What is claimed is:

1. An improved locking lid engaging a modified in-ground utility junction box to provide protection against damage or theft to the contents of the in-ground utility junction box, said in-ground utility junction box, defining an upper opening with an upper rim collar receiving said improved locking lid, said in-ground utility junction box further defining a lower opening, two ends and two sides, modified to include locking apertures bored through said ends of said in-ground utility junction box, said improved locking lid comprising:
    an upper plate defining an upper and lower surface, two ends and two sides, said sides and ends defining depending edges, said upper plate forming a secure fit within said upper rim collar of said in-ground utility junction box, said upper plate further defining a central opening;
    a C-shaped support bar defining a central bore, a lower surface and an upward facing channel opening, said C-shaped support bar welded to said lower surface of said upper plate further extending a lock extension flange defining a transverse bore, exposed through said central opening of said upper plate;
    a pair of radially aligned pin sleeves, each said pin sleeve attached to said lower surface of said support bar having an outer end directed horizontally towards each respective end of said upper plate and an inner end directed towards said central bore of said support bar;
    at least two radially aligned locking pins, each said locking pin defining a cam end directed towards said central bore of said support bar and a lock end, extending through each said respective pin sleeve, said lock end defining a central tapered point and said cam end defining a pin collar;
    a torsion spring engaging each said respective locking pin between said pin collar and said pin sleeve urging each said locking pin inwards in a disengaged position unless forced outward;
    a cam bolt support plate defining an upper surface attached to said lower surface of said support bar, said cam bolt support plate defining a central aperture aligned centrally with said central bore of said support bar and a lower surface, said central aperture smaller that said central bore;
    a cam bolt defining an upper tool head and a lower threaded shaft placed within said central aperture of said cam bolt support plate with said tool head above said upper surface of said cam bolt support plate and accessible through said central opening of said upper plate and said central bore of said support bar;
    a cam plate defining a central cam opening engaging said lower threaded shaft of said cam bolt below said lower surface of said cam bolt support plate by a washer above an upper surface of said cam plate and lock nut securing said cam plate to said cam bolt below said cam plate, said cam plate further defining an outer perimeter edge forming two convex curves on opposing sides with an S-curve defined on said outer perimeter edge between said convex curves, said cam plate being bilaterally symmetrical in shape, each said S-curve further defining an elongated first end with a stop tip, and a shortened second end with a stop tip, said first end extending radially at a further distance from said central cam opening than said second end, each said S-curve in constant contact with each said respective cam end of said respective locking pin, with said torsion spring urging said cam end into said S-shaped curve of said outer perimeter margin, wherein said cam plate is rotated by forced rotation os said tool head of said cam bolt through said central opening of said upper plate, each said stop tip of said first end and stop tip of said second end limiting rotation of said cam plate to a quarter turn while allowing said cam plate clockwise or counter clockwise rotation causing each said cam end of each said locking pin to move along said S-curve of said outer perimeter edge of said cam plate, with each said locking pin being respectively but equally extended outward forcing said respective locks end of each respective locking pin beyond said edges of said upper plate into respective said locking apertures of said utility junction box when said cam end is forced outward when in contact with said first end of said S-curve of said outer margin into a locked position, said locking pins allowed to retract inward withdrawing said lock ends of each said locking pin from said locking apertures of said utility junction box behind said edges of said upper plate into an unlocked position when in contact with said second end of said S-curve of said outer perimeter edge, thus providing said locking lid with a locked and unlocked engagement within said utility junction box.

2. The improved locking lid of claim 1, further comprising:
    a hidden shackle circular lock defining a hidden shackle with a circular shape and a flat side profile and a lower opening within a lower surface receiving said lock extension flange, said hidden shackle circular lock being applied and removed through said central opening of said upper plate, said hidden shackle circular lock providing an internal hidden shackle which is passed through said transverse lock bore of said lock extension flange by the rotation of a lock key which secures said circular lock to said lock extension flange, wherein said hidden shackle lock cannot be removed from said lock extension flange until unlocked by a lock key with said hidden shackle lock eliminating any visible or physical access to said tool head of said cam bolt and preventing rotation of said cam plate through said cam bolt to retract said locking pins while said locking lid is locked with said utility junction box.

3. The improved locking lid of claim 1, further comprising:
- a weather plate attaching above said central opening of said upper plate, said weather plate larger than said central opening and attaching to said upper plate by at least two screws, two nuts and bolts or two rivets through at least two holes defined through said upper plate, said weather plate preventing water and moisture from entry into said improved locking lid.

4. The improved locking lid of claim 1, wherein said central opening of said upper plate provides restricted vertical access to said tool head of said cam bolt and restricted vertical access for application of a circular lock to said lock extension flange to said lock extension flange extending upward from said support bar.

5. The improved locking lid of claim 1 further comprising:
- said locking lid is constructed of a strong, weather resistant metal, selected from a group comprised of stainless steel, coated steel, high carbon steel or a cast metal;
- said locking pins are made of a dense rolled steel cylindrical pin milled to define said central tapered point of said lock end with said pin collar being removable for replacement of said torsion spring if needed; and
- said attachment of said support bar to said upper plate, said lock extension flange to said support bar, and said pin collar to said lower surface of said support bar is conducted by welding;
- said construction and formation of said upper plate to form said ends, sides and depending edges is by welding or break press formation.

* * * * *